Nov. 7, 1961 G. H. WEISEMANN 3,007,973
OXO PROCESS WITH IMPROVED HYDROGENATION
Filed Nov. 30, 1955
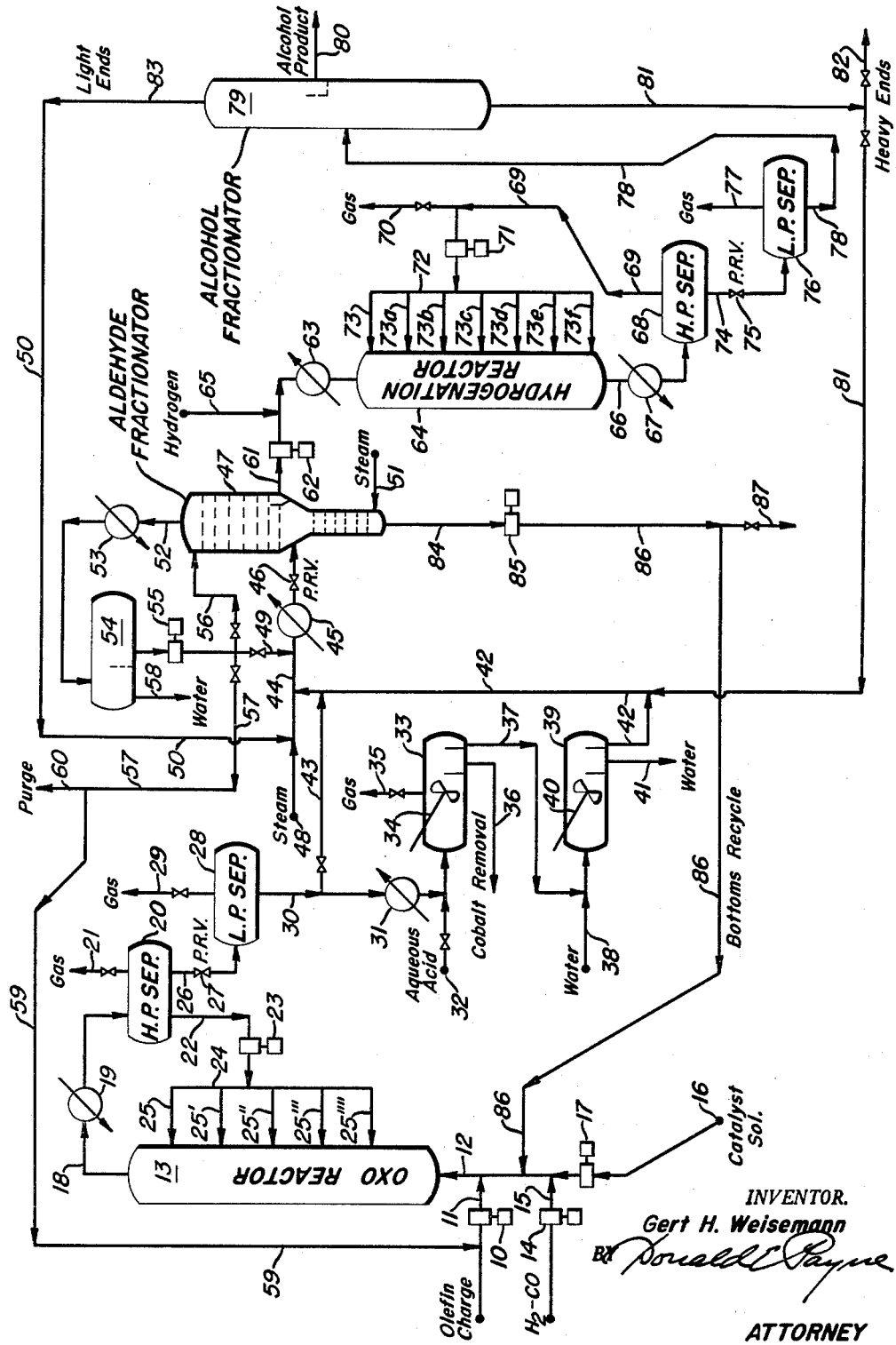
INVENTOR.
Gert H. Weisemann
BY Donald E. Payne
ATTORNEY United States Patent Office 3,007,973
Patented Nov. 7, 1961

3,007,973
OXO PROCESS WITH IMPROVED
HYDROGENATION
Gert H. Weisemann, Hobart, Ind., assignor to Standard Oil Company, Chicago, Ill., a corporation of Indiana
Filed Nov. 30, 1955, Ser. No. 549,975
3 Claims. (Cl. 260—638)

This invention relates to improvements in the oxo process for the manufacture of high boiling alcohols from olefins and it pertains more particularly to improvements in the hydrogenation step of the process and to the integration thereof with the rest of the system.

In the oxo process, e.g. as described in U.S. 2,638,487-8 a high boiling aldehyde stream produced by the oxolation (formylation) step must be subsequently hydrogenated in order to obtain the desired alcohols. The hydrogenation step has presented problems and been the source of operating difficulty. Effective catalyst life has been unduly short, conversion of aldehydes and/or alcohols to hydrocarbons by paraffination has been excessive, undesirable by-products have been formed in the hydrogenation step and the desired uniformity of product quality has not always been attainable. The object of this invention is to provide an improved method and means for hydrogenating a high boiling oxo aldehyde stream which will avoid difficulties heretofore encountered, which will enormously extend the useful life of the hydrogenation catalyst, which will inhibit losses by paraffination and side reactions and which will insure uniformity of hydrogenated product quality. A further object is to increase the efficiency of the over-all oxo process, decrease required capital investment and operating costs and increase the yields and quality of alcohols obtainable. Other objects will be apparent as the detailed description of the invention proceeds.

Prior efforts to obtain the most effective utilization of hydrogenation catalyst have been directed toward maintaining a substantially uniform hydrogenation temperature accompanied by a recycle of an aliquot part of the hydrogenated product stream. I have now found that markedly improved hydrogenation of a high boiling oxo aldehyde stream may be effected by employing a cobalt-on-pumice catalyst containing about 4 to 40 percent of cobalt and preferably about 15 to 25 or about 20 percent cobalt, maintaining a temperature gradient of about 100 to 150° F. across substantially the length of the reactor and operating in a temperature range to leave about 1 percent to 2 percent of unconverted aldehyde in the hydrogenated stream, the hydrogenation being effected under a pressure in the range of about 1500 to 4500 p.s.i.g., preferably about 3000 p.s.i.g., at a liquid space velocity in the range of about .1 to 1 or approximately .5. In this hydrogenation procedure the aldehyde stream is at least partially in the liquid phase and it flows downwardly through the catalyst bed concurrently with the introduced hydrogen. The temperature gradient is obtained by controlling the amount and temperature of recycled hydrogen which is introduced into the reactor at vertically spaced levels.

The purpose of the temperature gradient operation is to provide mild conditions where aldehyde concentration is highest and to increase the severity of hydrogenation conditions as the amount of unhydrogenated aldehydes decrease during the passage of the liquid stream from the top to the bottom of the reactor. At the beginning of a run with fresh catalyst the inlet temperature should be in the range of about 350 to 400° F., inlet temperatures somewhat lower than 350° F. being possible with catalyst of high cobalt content. The temperature rise is a rough indication of the extent of conversion and the temperature rise in the inlet end or top third of the reactor should be limited to about 30 to 70 percent of the total temperature gradient; at the beginning of a run the temperature rise in the top third of the reactor is preferably about 60 percent of the total gradient but near the end of the run it may decrease to approximately 50 percent thereof. In the middle third of the reactor the temperature rise should be limited to about 50 to 20 percent of the total gradient; at the beginning of a run it may be about 30 percent and toward the end of the run about 40 percent thereof. The temperature rise in the bottom third of the reactor should not be more than 20 percent of the total gradient and it is preferably only about 10 percent thereof; at this level there are much larger quantities of hydrogen to absorb liberated heat of hydrogenation and, furthermore, the amount of unhydrogenated aldehydes is relatively small. The lowermost or outlet temperature may even be somewhat lower than the temperature higher up in the bottom third although it is preferred to have the highest temperature close to the bottom of the reactor, this highest temperature being in the range of about 450 to 600° F. depending upon the inlet temperature.

As a run with any batch of catalyst proceeds, there is a gradual decline in catalyst activity and it is therefore necessary to increase the temperature level of the operation. This temperature level, however, should be maintained low enough to leave about 1 to 2 percent of aldehyde in the final hydrogenation effluent. By recycling the total overhead from the final product distillation tower to the aldehyde fractionation step, I can avoid any aldehyde losses and by avoiding complete hydrogenation I greatly minimize losses by paraffination or by-product formation. When a uniform temperature is maintained across the hydrogenation reactor as much as 30 percent of the aldehydes may be converted to paraffins; such paraffination may be decreased to a considerable extent by recycling an aliquot portion of the hydrogenated liquid but, by my technique, the recycle of hydrogenated liquid is avoided and paraffination is still further decreased to the point where it may be practically negligible. With prior constant temperature operations catalyst life was only about two weeks during which time conversion dropped to about 96 percent and paraffination increased to about 10 to 20 percent; by employing my defined temperature gradient technique, a batch of catalyst may be employed for upwards of six weeks and during the entire period losses to paraffination are less than about 5 percent, product quality is remarkably uniform and over-all yields are markedly increased.

The invention will be more clearly understood from the following detailed description of a specific example read in conjunction with the accompanying drawing which is a schematic flow diagram of a commercial plant for producing octyl alcohols.

While my invention is applicable to any oxo process employing an aliphatic olefin charge containing 3 to 15 or more carbon atoms per molecule, it will be described as applied to a conversion of a heptene stream which, after removal of lower boiling and higher boiling materials, is introduced by pump 10 and lines 11 and 12 into oxo reactor 13. A 1:1 hydrogen-carbon monoxide mixture is introduced into said reactor by compressor 14 and lines 15 and 12 although the ratio of hydrogen to carbon monoxide may, of course, vary to a considerable extent. A 6 percent solution of an oil-soluble cobalt salt such as cobalt tallate or cobalt naphthenate is introduced as a heptene solution from source 16 by pump 17 to line 12.

The oxo reactor is operated at a pressure of about 1500 to 4000, e.g. about 2500, p.s.i.g. at a temperature in the range of about 150 to 400° F., preferably about 300 to 330° F., with a liquid space velocity (volumes of fresh liquid charging stock per hour per volume of reactor space) of about .1 to 1.5, e.g. about .5, with about .01 to .2, e.g. about .1 weight percent, catalyst as cobalt and about 20 to 60 cubic feet of hydrogen-carbon monoxide gas per gallon of olefin charged.

The oxolation reactor effluent is withdrawn through line 18 through cooler 19 to high pressure separator 20 which preferably operates at about 100° F. and under substantially the same pressure as the reactor. While gases may be vented from the separator through line 21 it has been found that by properly controlling the rate of gas introduction by compressor 14, no appreciable amounts of gas require venting at this point. A part of the liquid condensate is returned by line 22, pump 23, manifold 24 and spaced inlet lines 25, 25', 25'', 25''' and 25'''' at spaced upper parts of the reactor for temperature control. That portion of the reactor between the bottom thereof and the lowermost liquid recycle line 25'''' ordinarily does not require cooling since in this portion of the reactor the catalyst is being converted to cobalt hydrocarbonyl so that no cooling of this portion of the reactor is necessary.

The net liquid produced is withdrawn from separator 20 by line 26 through pressure-reducing valve 27 and introduced into low pressure separator 28 which is maintained at a pressure not higher than about 40 p.s.i. and preferably in the range of about 10 to 30 p.s.i. Most of the hydrogen and carbon monoxide is released from the liquid in this low pressure separation step and is withdrawn from the system through vent line 29. Vent line 29 may be provided with a cooler for preventing loss of condensable hydrocarbons or condensable material may be recovered from the vented gas in any known manner. If desired, a stripping gas may be introduced at the base of the low pressure separator to assist in the removal of hydrogen and carbon monoxide and thus decompose any cobalt hydrocarbonyl that may remain in the separated liquid.

Liquid from low pressure separator 28 is passed by line 30 through heat exchanger 31, aqueous acid such, for example, as 5 to 10 percent sulfuric acid is introduced from source 32 and the combined streams are then introduced into cobalt removal vessel 33 wherein the aqueous acid is intimately mixed with the liquid at a temperature of about 150° F. by stirrer 34. Any remaining gases may be vented through line 35 and if hydrogen and carbon monoxide were not stripped in low pressure separator 28, such stripping may be effected in the cobalt-removing vessel 33. While it is preferred to employ an aqueous acid for removing cobalt from the product liquid at this point, most of the cobalt may be removed from the liquid by simply introducing water from source 32. The aqueous cobalt containing liquid is withdrawn from the system through line 36 and cobalt may be recovered from the withdrawn stream in any known manner. The decobalted solution is withdrawn through line 37 and introduced together with water from source 38 into wash vessel 39 provided with mixer 40, an additional aqueous stream containing some cobalt being withdrawn through line 41 and the decobalted stream being withdrawn through line 42 for fractionation. The water washing step is not always necessary and, in fact, if cobalt is removed with purged bottoms it is unnecessary to effect decobalting at this stage in which case liquid from low pressure separator 28 may be introduced directly through line 43 to line 42.

The stream from line 42 is introduced by line 44, heater 45 and pressure-reducing valve 46 into flash distillation vessel fractionator 47 together with steam from source 48 and recycled hydrocarbons from line 49 and preferably with recycled light ends from line 50. The combined stream is preheated by exchanger 45 to about 200° F. and fractionator 47 is operated at a pressure of about 200 millimeters mercury. That portion of the fractionator which is above the feed inlet is preferably of larger diameter than the portion below the feed inlet since it is desirable to effect as much flash distillation as possible. Stripping steam is introduced at the base of the narrowed section of fractionator 47 through line 51 at a temperature to maintain the bottoms temperature in the fractionator about 290° F. Overhead from the fractionator passes by line 52 through condenser 53 to receiver 54 from which condensed liquid is withdrawn by pump 55, one part of the liquid being returned through line 56 as reflux, another part being introduced by line 49 to line 44 and the remainder being withdrawn through line 57. A part of this remainder may be recycled by line 59 to olefin inlet line 11 in which case the condensed olefin forms a part of the fresh olefin charged. It is essential, however, that at least a part of the stream from line 57 be purged through line 60 in order to prevent paraffin buildup. Water is removed from receiver 54 by line 58.

The heart cut $C_8$ aldehyde stream (which usually contains some alcohol) is withdrawn from fractionator 47 through line 61 and pumped by pump 62 through heater 63 to hydrogenation vessel 64 together with the required amount of hydrogen introduced by line 65, the amount of hydrogen being in excess of stoichiometric requirements. In this example the hydrogenation vessel is maintained under a pressure of about 3000 p.s.i.g. and it is packed with a catalyst consisting essentially of 20 percent cobalt-on-pumice. In starting up with a fresh batch of said catalyst in active form, the aldehyde stream in admixture with hydrogen is preheated to a temperature of about 350° F. although, with a very active catalyst, the preheat temperature may be 330° F. or even as low as 300° F. Heretofore it was the practice to maintain the hydrogenation temperature substantially constant throughout the length of the reactor, to pass reactor effluent through line 66 and cooler 67 to high pressure separator 68, to withdraw separated hydrogen through line 69, to vent a small amount of hydrogen through line 70 and to recycle a large amount of the cooled hydrogen by compressor 71 through manifold 72 and spaced inlet points 73, 73a, 73b, 73c, 73d, 73e, 73f, the amount of hydrogen introduced at these various levels being controlled to maintain a substantially uniform temperature in the reactor. Also, an aliquot part of the liquid from separator 74 was recycled through the hydrogenation vessel. The following technique, however, has been found to be a vast improvement over prior practice.

With the inlet temperature at the beginning of the run of fresh catalyst at about 350° F., the temperature is permitted to rise through a "gradient" of about 100 to 150° F. as it flows from the top of the reactor to the bottom thereof. While the gradient may be 10 or 20° F. higher or lower than the defined limits, this approximate gradient has been found to be most effective. It is preferred that instead of employing a uniform gradient, the major portion of the temperature rise, i.e. about 30 to 70 percent of the total gradient, should occur in the top third of the reactor, that most of the remaining temperature rise, i.e. about 50 to 20 percent of the total gradient, should occur in the middle third and that only a small amount, i.e. less than 20 percent of the total gradient, should occur in the bottom third of the reactor. As the run progresses, the inlet temperature is gradually increased until an inlet temperature in the range of 450 to 500° F. is reached but the defined temperature gradient is maintained across substantially the entire length of the reactor throughout the catalyst life. The highest temperature was always maintained in the lower third of the reactor and is in the range of about 450 to 600° F., being lower at the beginning than at the end of a run with each batch of catalyst. The temperatures employed should in all cases be adjusted to leave about 1 to 2 percent of aldehyde in the final hydrogenation effluent.

In this specific example with an inlet temperature of 350° F. and a final temperature of 500° F. at the beginning of a run with a batch of fresh catalyst, the temperature is allowed to increase to about 440° F. at a level about one-third of the way down, it is allowed to rise to about 485° F. two-thirds of the way down and it increases to about 500° F. before leaving the bottom of the reactor. The temperature rise is controlled in current operations by manually regulating the amount of hydrogen introduced through lines 73, 73a, 73b, 73c, 73d, 73e and 73f, but it should be understood that automatic temperature responsive control means may be employed for controlling the rate and amount of hydrogen introduced at each level and that any other known temperature control means may be employed.

As the run progresses and the catalyst becomes less active, particularly at the inlet end of the reactor, the inlet temperature of the aldehyde stream is gradually increased so that after a month or so on-stream an inlet temperature of about 420° F. may be required with a gradient across the reactor of about 120° F. and a final temperature of about 540° F. in order to obtain an effluent containing 1 to 2 percent of aldehyde. During this mid portion of the life of the catalyst the temperature rise in the upper third of the reactor may be of the order of about 60° F., in the middle third about 48° F. and in the final third about 12° F. Near the end of the effective catalyst life the inlet temperature may be about 460° F. with a gradient of 130° F., the temperature rise in the first third being about 65° F., in the second third about 60° F. and in the bottom third about 5° F. Thus as the catalyst life progresses, the pattern of the gradient is preferably changed to permit a larger portion of the temperature rise to occur in the middle third of the reactor. At all times, however, the temperature rise in the bottom third of the reactor is less than half of the temperature rise in the middle third and most of the temperature rise takes place in the upper third of the reactor. Thus most of the aldehydes are converted in the upper third of the reactor where the temperature is lowest, most of the remaining aldehydes are converted in the mid section at intermediate severity, and in the bottom portion of the reactor where temperatures are highest all but about 1 to 2 percent of the aldehydes are converted.

The liquid from high pressure separator 68 passes by line 74 through pressure-reducing valve 75 to low pressure separator 76 from which gas is vented through line 77. After hydrogen separation the liquid may be caustic-washed at about 100° F., e.g. with 15 percent KOH solution, for the removal of formate esters, etc. and the caustic-washed solution may then be water-washed in equipment similar to that employed for acid and water-washing of oxo reactor effluent. The liquid is then introduced by line 78 to the alcohol fractionation system diagrammatically illustrated by tower 79, the desired alcohol product stream being withdrawn through line 80. The material higher boiling than the desired alcohol may be recycled by line 81 to line 42 and thence back to aldehyde fractionator 47 although it may be preferred to withdraw the final bottoms through line 82 and separately recover any alcohol which may be contained therein. Products lower boiling than the desired alcohol are taken overhead through line 83 and are preferably recycled by line 50 to aldehyde fractionator 47; this recycle of the light ends from the product fractionation system is particularly important in conjunction with my improved hydrogenation technique since it avoids any loss of unconverted aldehyde from the system. Usually two separate fractionating towers will be employed instead of a single column; the bottoms may be removed from the hydrogenated product in the first column and the overhead from the first column introduced to a second column for removing low boiling material or, alternatively, the low boiling material may be removed from the hydrogenated stream in a first column and the bottoms from the first column may be introduced into a second column for separating alcohol from final bottoms.

The bottoms from aldehyde fractionator 47 are withdrawn through line 84 by pump 85 and preferably at least a major portion thereof is recycled through line 86 and line 12 to reactor 13, a minor portion of the so-called oxo bottoms being withdrawn through line 87. This recycle of oxo bottoms greatly increases the yield of desired alcohols from a given amount of olefin charge as does the recycle of olefins through line 59. When these features are coupled with my improved temperature gradient hydrogenation technique and with the recycle of product light ends through line 50 to the aldehyde fractionator, the yields of oxo alcohols can be enormously increased and, at the same time, the quality of the product alcohol can be maintained uniformly high.

While a particular example of my invention has been described in considerable detail, it should be understood that alternative steps and conditions will be apparent from the foregoing description to those skilled in the art.

I claim:

1. In the oxo process for making high boiling alcohols wherein oxolation reactor effluent is fractionated to separate an aldehyde stream from higher boiling and lower boiling components and wherein the aldehyde stream is subsequently hydrogenated in a hydrogenation zone by downward passage in liquid phase through a catalyst bed consisting essentially of about 20 percent of cobalt-on-pumice under a pressure in the range of 1500 to 4500 p.s.i.g. at a temperature in the range of about 350 to 600° F. with a liquid space velocity in the range of about .1 to 1 volumes of introduced aldehyde stream per hour per volume of catalyst and in the presence of an excess amount of hydrogen and wherein the temperature of the hydrogenation is controlled by cooling the hydrogenation effluent stream, separating hydrogen therefrom and recycling separated hydrogen in controlled amounts at vertically spaced levels in said hydrogenation zone, the improved method of operation which comprises introducing into the hydrogenation zone the aldehyde stream at the beginning of a run with fresh cobalt-on-pumice catalyst at an inlet temperature in the range of about 350 to 400° F., increasing the inlet temperature ultimately to about 450° F. but not higher than 500° F. as the catalyst becomes less active with on-stream use, maintaining a temperature gradient in the range of about 100 to 150° F. across substantially the length of the catalyst bed throughout the period of catalyst use, maintaining a final catalyst bed outlet temperature in the range of about 450 to 600° F., said temperature being lower at the beginning than at the end of the on-stream use of the catalyst, limiting the temperature rise in the inlet third of the catalyst bed to about 30 to 70 percent of the total temperature gradient, limiting the temperature rise in the middle third of the catalyst bed to about 50 to 20 percent of the total temperature gradient, limiting the temperature rise in the outlet third of the catalyst bed to less than 20 percent of the total temperature gradient, and limiting the inlet and outlet temperatures while employing said temperature gradient to leave about 1 to 2 percent of aldehyde in the final hydrogenation effluent.

2. The method of claim 1 wherein the temperature rise in the top third constitutes approximately 60 percent of the total gradient and the temperature rise in the middle third constitutes about 30 percent of the total gradient during the initial stages of a hydrogenation run with a given batch of catalyst and wherein the temperature rise in the top third is about 50 percent and the temperature in the middle third about 40 percent of the total gradient in the final stages of a hydrogenation with said batch of catalyst.

3. The method of claim 1 which includes the steps of fractionating hydrogenation effluent to remove substantially all unconverted aldehyde and a portion of the alcohol as an overhead stream and combining said overhead stream with oxolation reactor effluent for fractionation to obtain the aldehyde stream charged to the hydrogenation step.

References Cited in the file of this patent
UNITED STATES PATENTS

| | | |
|---|---|---|
| 2,650,941 | Koome et al. | Sept. 1, 1953 |
| 2,744,939 | Kennel | May 8, 1956 |
| 2,759,025 | Carter et al. | Aug. 14, 1956 |

OTHER REFERENCES

Meyer, "Oxo Process," Charles A. Meyer & Co., Inc., 25 Vanderbilt Ave., New York, N.Y. (1948), pages 57, 64, 65, 66.